C. F. GRAY.
FILLER.
APPLICATION FILED MAY 25, 1906. RENEWED APR. 22, 1909.
925,169.
Patented June 15, 1909.
3 SHEETS—SHEET 1.
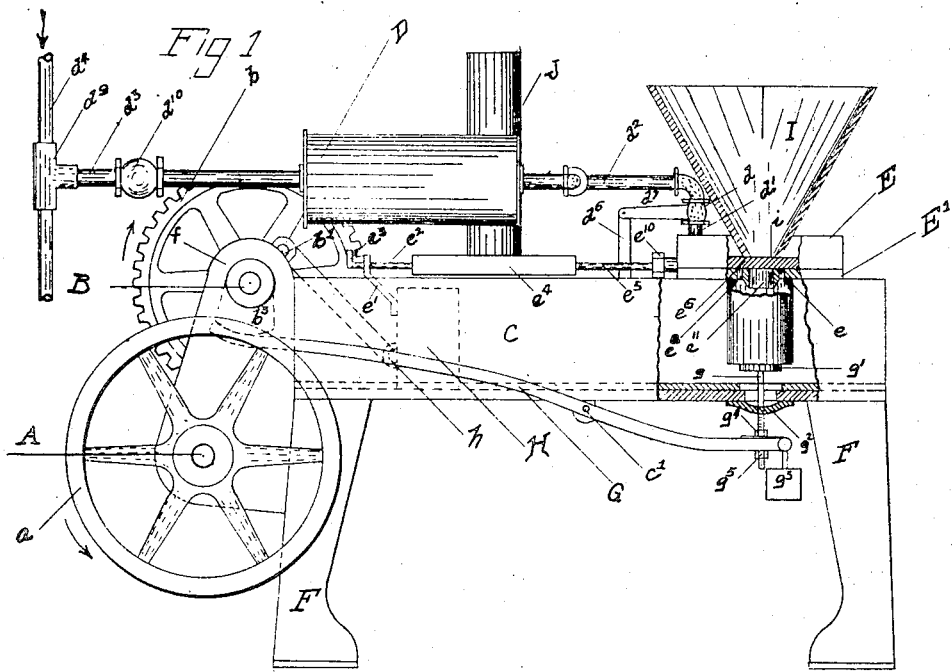
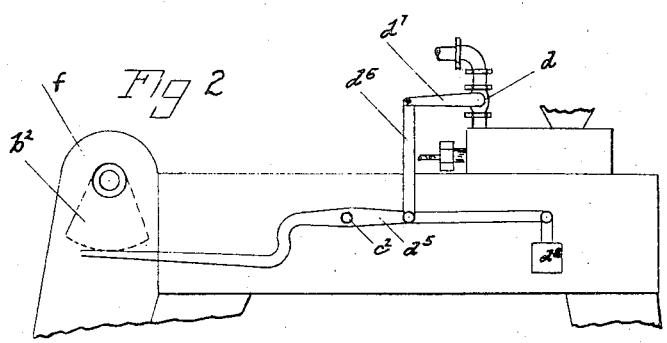
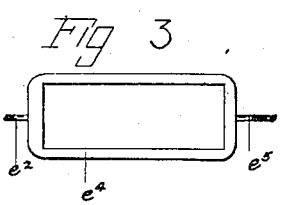
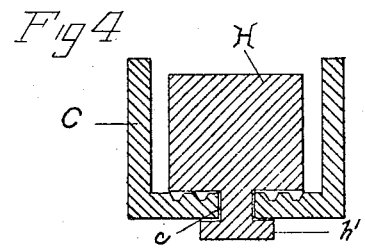
WITNESSES:
Joseph R. Gardner
Frdk G. Mohr
INVENTOR.
Charles F. Gray
BY Walter A. Knight
ATTORNEY.

C. F. GRAY.
FILLER.
APPLICATION FILED MAY 25, 1906. RENEWED APR. 22, 1909.
925,169. Patented June 15, 1909.
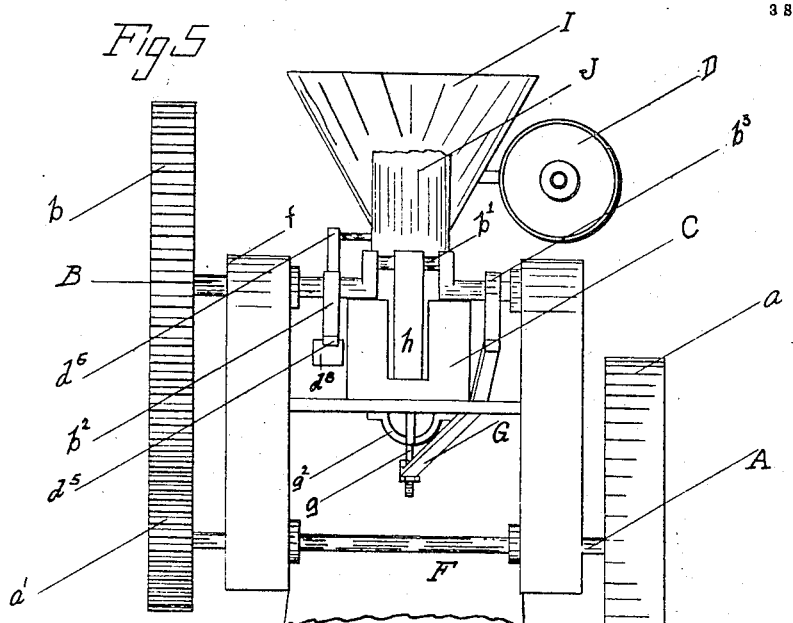
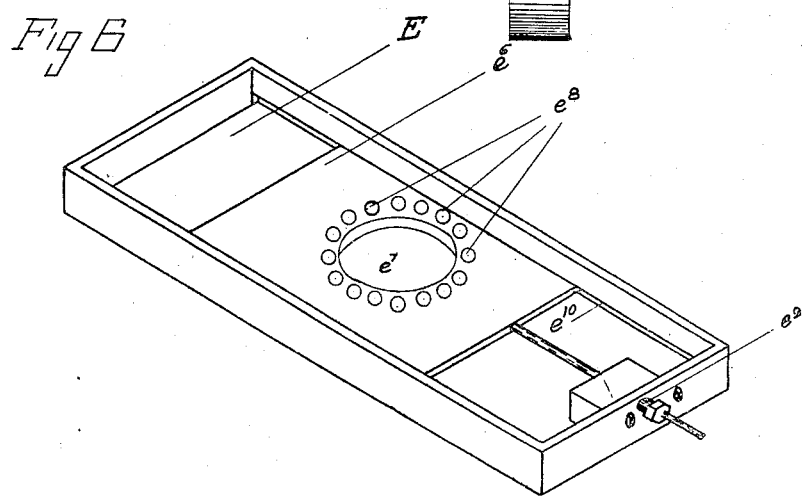
WITNESSES:
Joseph R. Gardner
Frdk G. Mohr
INVENTOR.
Charles F. Gray
BY
Walter A. Knight
ATTORNEY.

C. F. GRAY.
FILLER.
APPLICATION FILED MAY 25, 1906. RENEWED APR. 22, 1909.
925,169.
Patented June 15, 1909.
3 SHEETS—SHEET 3.
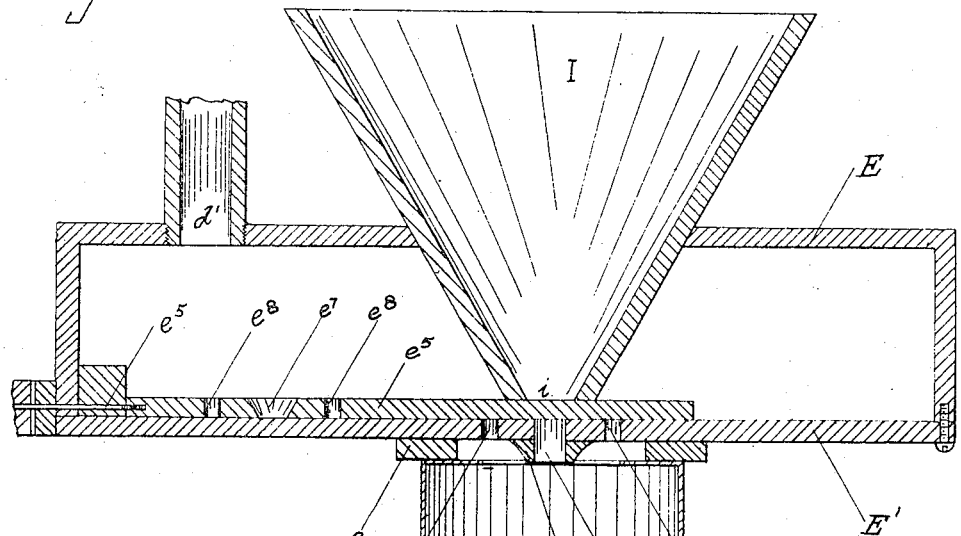
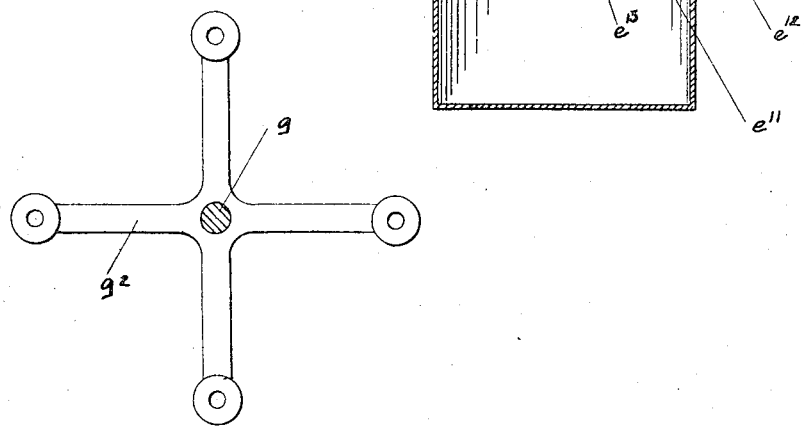

UNITED STATES PATENT OFFICE.

CHARLES F. GRAY, OF INDIANAPOLIS, INDIANA, ASSIGNOR, BY MESNE ASSIGNMENTS, TO FEDERAL CANNING MACHINERY COMPANY, OF INDIANAPOLIS, INDIANA, A CORPORATION OF INDIANA.

FILLER.

No. 925,169.  Specification of Letters Patent.  Patented June 15, 1909.

Application filed May 25, 1906, Serial No. 318,718. Renewed April 22, 1909. Serial No. 491,598.

*To all whom it may concern:*

Be it known that I, CHARLES F. GRAY, a citizen of the United States, residing at Indianapolis, in the county of Marion and State of Indiana, have invented new and useful Improvements in Fillers, of which the following is a specification.

My invention relates to mechanical means for filling fruit or other goods to be preserved by canning, into cans or other containers.

Filling machines now used for this purpose force the goods into the container while it is filled with air, expelling the air. As the containers are aimed to be filled very rapidly a great deal of air must be expelled instantly through a very little space, hence considerable air is forced into the pores of and the interstices between the fruit or other goods being canned; and the goods, being forced in against the air, causes considerable wasting of the goods. In the present type of mechanical fillers the forcing in of the goods, particularly such tender fruit as tomatoes, causes them to be crushed and torn instead of filled in whole, hence there is an excess of juice, the fruit does not look as well when opened for use; and the cans are not of uniform weight, besides wasting the goods. Because of this deterioration in the quality of the goods mechanically packed, the choicest fruit is "hand-packed."

My improved filler exhausts the air from the container, whereupon the downward pressure of air upon the goods in the hopper immediately forces the goods into the container completely filling the same. Not only will the work done be superior in quality but the rapidity of its proper operation will be limited only by the time required to effect repetitions of the successive mechanical movements; and the machine is so constructed as to require little attention, while the filled cans are of maximum and uniform weight.

A convenient form of my invention is illustrated in the accompanying drawings, in which:

Figure 1, is a side elevation of the machine with portions of the bed and vacuum chamber broken away. Fig. 2, is a detail of the vacuum chamber valve and its controlling mechanism with the interfering parts of the bed broken away. Fig. 3, is a detail of a portion of the hopper closing mechanism. Fig. 4, is a vertical lateral section through the sliding head and bed. Fig. 5, is a rear elevation of my filler with a part of the frame removed. Fig. 6, is an isometric view of the vacuum chest with the top and bottom removed. Fig. 7, is a vertical longitudinal section through the vacuum chest, axially of the valve pipe, hopper, exit aperture and stuffing box, showing a can also in axial section, in position underneath. Fig. 8, is a plan view of the plunger guide, with plunger rod in position in section.

Referring to the drawings, it will be seen that the machine is composed of the frame, F, bed, C, shafts, A, and B, with their connections for receiving and delivering the necessary power, the vacuum chamber, E, with the knife, $e^6$, and attendant parts, the container elevating and clamping mechanism consisting of lever, G, etc., the hopper, I, the container chute J, the container forwarding mechanism, H, and attendant parts, and the tank, D, and attendant parts constituting the vacuum producing and regulating mechanism.

The bed, C, is a trough preferably with straight sides flat longitudinally ribbed bottom and open top and ends. The bottom of the bed is longitudinally slotted by slot, c, at the back to receive tee head, $h^1$ of the sliding head, H. Its width is preferably a trifle greater than the diameter of the container to be handled and somewhat higher than the height of said container.

A, and B, are shafts adapted to rotate in suitable journals, f, f, cast on or attached to the frame, F. A pulley a, adapted to be driven by any suitable power is rotatively attached to the shaft, A. A pinion, $a^1$, is also rotatively attached to said shaft, and meshes with gear, b, which is rotatively attached to the crank shaft, B. Journaled to the wrist pin, $b^1$, of the shaft, B, is a connecting rod, h, journaled to the sliding head, H, so that by the revolution of the shaft, B, a reciprocating motion is conveyed to the attached sliding head, H. The sliding head, H, is formed with the tee head, $h^1$, at the bottom insuring smooth and restricted movement in the slot, c, in the bed, C. The farthest point reached by the forward face on said sliding head, on its forward stroke, is one-half of a container's diameter past the axial line of the chute, J, down which the containers are fed. The full stroke of the sliding head is equal to the diameter of a container. The distance between the center of the container chute exit and the center of the exit aperture, $i$, of the hopper, I, and of the registering openings, $e^7$ and $e^{11}$, must be some exact multiple of a container's diameter. Also rotatively attached to shaft, B, are cams, $b^2$, and $b^3$. Cam, $b^2$, is adapted to actuate the lever, $d^5$, which is pivoted to the bed, C, at $c^2$. The lever, $d^5$, is pivoted to the lever, $d^6$, which it actuates, and lever, $d^6$, is pivoted to the lever, $d^7$, which operates the valve, $d$, preferably a rocker valve. Valve, $d$, is opened when cam, $b^2$, depresses the contiguous end of the lever, $d^5$, and when the lever is released by the cam the weight, $d^8$, closes the valve.

Cam, $b^3$, is adapted to press the contiguous end of the lever, G, which is pivoted to the bed, C, at the point, $c^1$, and is so shaped as to be adapted to center the plunger rod, $g$, which is so fixed to the lever, G, as to be vertically adjustable under the vacuum chest exit, $e^{11}$. The plunger rod, $g$, carries on its upper end a plunger, $g^1$, which when not operated by the cam, $b^3$, is flush with the inside surface of the bottom of the bed, C. When raised by the cam, $b^3$, the plunger, $g^1$, rises to such a height as to press a container centered over said plunger, up against a packing ring, $e$, hereafter to be described. The pressure with which the container is held against the packing ring may be prearranged by vertical adjustment of the plunger rod, $g$. The drawings illustrate a convenient means of making such adjustment, the rod, $g$, being threaded at its lower end and a nut $g^4$, being placed above, another, $g^5$, below the lever, $g$. To the lower surface of the bed, C, surrounding the hole through which the plunger operates, is attached the part, $g^2$, preferably furcated to facilitate drainage of overflow juice, etc., and cleaning after use; and is pierced by the rod, $g$, which it guides. Weight of the filled container and of the weight, $g^3$, attached to the forward end of the lever, G, depresses this end of said lever, as soon as the opposite end is released by its cam.

Rigidly attached to any convenient part of the sliding head mechanism, as at the back of the sliding head, H, is a bracket, $e^1$, loosely pierced by the rod, $e^2$, to permit free reciprocation. Rod, $e^2$, is terminated toward the rear of the machine with a hook or collar, $e^3$, and at the forward end, in one end of a link, $e^4$, one side of which extends on either side the container chute, J, and the link sides are sufficiently long to permit free reciprocation of the knife mechanism. To the other end of said link is fastened the rod, $e^5$, which enters the vacuum chest, E, passing through the stuffing box, $e^9$, and being fixed securely to the knife, $e^6$, which is adapted to slide backward and forward lengthwise of the chest, E, at the bottom thereof, preferably in groove, $e^{10}$. This knife has a large opening, $e^7$, surrounded by a convenient number of smaller openings $e^8$; all these openings being entirely within an area not greater than and conforming in shape to the opening of the container to be filled; and these openings are similar in size and arrangement to those of the bottom plate of the vacuum chamber, with which they register when in one extreme position. As the knife passes to the other extreme position out of register with the openings any contents of the can protruding from its opening will be cut off against the edges of the hopper exit, $i$, and the openings of the bottom plate, $E^1$, of the vacuum chamber; and the openings between the container and the hopper are closed so that air can neither be exhausted from the can nor goods fed into the can.

Steam passes through the pipe, $d^4$, in the direction indicated by the arrow, the outer end of said pipe being preferably open to avoid back pressure. Pipe, $d^4$, is connected with pipe, $d^3$, and an ordinary ejector or suction tee, $d^9$, and pipe $d^3$ is connected with the tank D. The operation of the ejector when all connections and passages are opened to the container exhausts the air from the pipe $d^3$, tank, D, pipe, $d^2$, valve, $d$, pipe, $d^1$, vacuum chest, E, and the container thereunder. The tank, D, being always open to the action of the steam passing through the pipe, $d^4$, maintains at all times a more or less perfect vacuum so that when the valve, $d$, is opened the rarefication of the air in the chest, E, and the container is more prompt and perfect. Between the ejector, $d^9$, and the tank, D, is a check valve, $d^{10}$, to prevent return of air to the tank.

By maintaining a constant flow of steam a more or less perfect vacuum is at all times maintained in the tank, D, which insures instantaneous rarefication of the air in the container, when said container is held in place and the connections opened between the container and the tank.

The vacuum chest, E, is constructed in any convenient manner, preferably with the top, end, and sides in one casting, as shown in Fig. 7, and the bottom a separate piece, $E^1$, adapted to be screwed to or otherwise attached to the main part of the chest making an air tight joint. $E^1$, has an opening, $e^{11}$, surrounded by a convenient number of smaller openings, $e^{12}$, the openings being similar and adapted to register with those of the knife; opening, $e^7$, with $e^{11}$, and openings, $e^8$, with $e^{12}$. A nozzle, $e^{13}$, is formed by a circumferential lip which protrudes from the under side of $E^1$, surrounding the opening, $e^{11}$. This nozzle is adapted to extend down into the container a short distance, when clamped in place for filling. Surrounding all the openings at the bottom of $E^1$, is a packing ring $e$, of rubber or other material, of such size, character and shape as to prevent air from entering the container when said container is pressed up by the plunger, $g^1$, forming an air tight joint between the vacuum chest and the container, the ring, $c$, fitting against the top of the container around its opening, preferably as shown in Fig. 7. The hopper I, extends through the vacuum chamber and terminates at the top of the knife, $e^6$. The pipe $d^1$, connecting the valve, $d$, and the vacuum chest pierces the chest, E, at any convenient point.

The operation of the machine is as follows: Let us consider that the containers to be used are the ordinary cylindrical tin cans, such as those commonly used in canning tomatoes, peaches, corn, etc., and that the machine has been constructed to handle this size can. Let the chute, J, be filled with the cans, apply power to the pulley, $a$, in the direction indicated by the arrow, and cause the shaft, A, to revolve. The revolution of the shaft, A, through the pinion, $a^1$, and the gear, $b$, causes the crank shaft, B, to be revolved. The motion of the crank through the connecting rod, $h$, forces the sliding head, H, forward toward the hopper end. The can which was first introduced into the receptacle, J, and is now directly under it, resting on the floor of the bed, is shoved forward toward the hopper end by the sliding head, H, a distance equal to its own diameter. During the sliding head's movement forward toward the hopper end, the superimposed cans in J, descend by gravity causing the second can to rest on the upper surface of the sliding head. Said can is prevented from moving along with the sliding head, by the chute, J, which surrounds or incloses a controlling portion thereof. On the return stroke of the sliding head the entire column of cans in the chute drop by the force of gravity as the sliding head is moved from under them and the bottom can rests on the floor of the bed under the can chute, and is in position to be moved toward the hopper end of the machine. As the distance between the can chute and the hopper exit is some exact multiple of the can's diameter, and as the stroke of the sliding head is equal to the diameter of the can, it is evident that when the required number of cans have been forwarded by the sliding head, the first can will be directly over the plunger, $g^1$. The above would not be true if the speed of the machine was great enough to impart such a velocity to the can as to cause its inertia to overcome the force of friction. The hopper, I, is filled with the goods to be canned and the steam is first allowed to flow through the pipe, $d^4$. At this point of the operation the first can has come directly over the plunger, $g^1$, and under the hopper exit. Cam, $b^4$, depresses lever, G, raising plunger rod, $g$, and plunger, $g^1$, pressing the can firmly up against the packing ring, $e$. During this time the bracket, $e^1$, has pressed against the link, $e^4$, and moved said link, the rod, $e^5$, and knife, $e^6$, toward the hopper end, causing the openings, $e^7$, $e^{11}$, and $i$, to register opening from the hopper to the can and opening from the vacuum chest to the container through the openings, $e^8$, and $e^{12}$. Then cam, $b^2$, has depressed lever, $d^5$, which acting through levers, $d^6$, and $d^7$, opens valve, $d$, and all the air in the can under the vacuum chest and in the vacuum chest is further greatly rarefied by the constant flow of steam through the pipe, $d^4$. The vacuum having been created in the container, the atmospheric pressure on the goods in the hopper forces the goods into the container, completely filling it. During this time the sliding head, H, has been on its return stroke and immediately after the container is filled, bracket, $e^1$, contacts with the projection, $c^3$, and causes the compound rod composed of parts, $e^2$, $e^4$, and $e^5$, as shown in the drawings, to move toward the crank, end carrying knife, $e^6$, causing the exit aperture, $i$, of hopper, I, to be closed and the can opening to be closed against the hopper and vacuum chest, as shown in Fig. 9. Immediately thereafter and synchronously, the cams, $b^2$, and $b^3$, release levers, $d^5$, and G, respectively and their weights, $d^8$, and $g^3$, assisted by the weight of the can, respectively causes the valve, $d$, to be closed and the plunger, $g^1$, to descend. As the levers, $d^5$, and G, are now in position to be again depressed by their respective cams, the sliding head, H, forwards the next container out of the bed at the forward end; and a further description of the operation would only be a repetition of the foregoing.

I claim as my invention and desire to secure by Letters Patent of the United States:—

1. In a can-filling machine, the combination of a vacuum-chest, a filling hopper entering and discharging through the same, a valve sliding on the vacuum-chest bottom as a seat, and beneath and against the hopper mouth as a seat, controlling simultaneously the hopper orifice and a corresponding orifice through the vacuum-chest bottom.

2. In a can-filling machine, the combination of a vacuum-chest and filling hopper arranged as indicated, and a valve adapted to slide upon the bottom of the chest and against the hopper mouth as its seats, and provided with a central discharge perforation registering with a corresponding perforation in the chest bottom and provided also with a concentric series of smaller perforations outside the area of the hopper mouth and registering with corresponding perforations through the chest bottom, the latter opening below into the annular space of the seating ring around the discharge exit, against which the can contacts when in place for filling.

3. An automatic machine for filling goods to be canned into containers; comprising a suitable stand and bed, a hopper for the goods, a vacuum chest connected to the hopper and adapted to operatively contact with a container beneath, a normally closed valve and pipe connecting the chest and valve, a tank and pipe connecting the chest and valve, a tank and pipe connecting valve and tank, a steam pipe and ejector and a pipe connecting the tank and steam pipe, a reciprocating can forwarding mechanism, a cam and cam actuated levers adapted to open said valve, a cam and cam actuated lever and normally depressed plunger adapted to force and hold a container against the under side of the vacuum chest.

4. In combination with a machine for automatically filling goods to be preserved, into containers, a vacuum chest $E$, $E^1$, into which the hopper I extends, terminating at the knife, $e^6$, said knife, having openings, $e^7$, $e^8$, means for actuating said knife, chest bottom, $E^1$, having openings, $e^{11}$, $e^{12}$, said openings, $e^7$, and $e^{11}$, so formed and placed as to be adapted to form a continuation of the hopper exit, in one position of said knife, packing ring, $e$, and means for exhausting the air from said chest.

5. A canning machine, consisting substantially of a hopper mounted upon and piercing a vacuum chest, said chest, means for positioning a can beneath said chest under the hopper, cut-off controlled openings on the under side of said chest for air and goods to be canned, valve controlled air connections between the chest, and a chamber adapted to contain rarefied air, and means beyond said chamber tending to maintain a vacuum in said chamber.

6. In a can-filling machine, the combination of a vacuum-chest, a filling hopper supported upon and extending into same, a perforated valve sliding on the bottom of the chest and against the hopper mouth, and a corresponding discharge aperture and conduit extending through and below the chest bottom, a longitudinal can-way below and constituting a support for the vacuum-chest and hopper, and means for automatically feeding cans in succession to the can-way and advancing them en-train to and beyond the discharge or filling conduit and elevating the can which is temporarily beneath and in line with the conduit into operative relations therewith and lowering the same when filled.

7. The combination of a longitudinal trough, constituting the bed of the machine and a can-way for feeding cans to be filled; a vacuum-chest and a filling hopper mounted thereon; an operating shaft journaled upon and across the rear end of the bed; a reciprocating head operating in the trough, or can-way, provided with connections with the crank shaft; a reciprocating slide valve for controlling the hopper-discharge, provided with connections with the crank-shaft; and a vertically reciprocating lifter operating through the bottom of the trough or can-way provided with cam connections with the crank shaft substantially as set forth.

8. In a can-filling machine of the character indicated, a vacuum-chest and filling hopper connected therewith, and a valve adapted to control simultaneously the discharge and air openings into the vacuum chest, in combination with a supplemental vacuum tank, and a steam ejector operating in connection therewith for maintaining a constant vacuum therein, and a valve-controlled connection between said vacuum chest and supplemental vacuum tank substantially as set forth.

In testimony whereof I have hereunto set my hand in presence of two subscribing witnesses.

CHARLES F. GRAY

Witnesses:
JOSEPH R. GARDNER,
FREDK. G. MOHR.